(12) United States Patent
Haire

(10) Patent No.: US 6,742,974 B2
(45) Date of Patent: Jun. 1, 2004

(54) COMPOSITE PANEL HAVING A SECURING TRACK INCORPORATED THEREIN AND ASSOCIATED APPARATUSES AND METHODS

(76) Inventor: A. Ralph Haire, 300 Valley Rd., Thomasville, NC (US) 27360

(*) Notice: Subject to any disclaimer, the term of this patent is extended or adjusted under 35 U.S.C. 154(b) by 0 days.

(21) Appl. No.: 10/386,164

(22) Filed: Mar. 10, 2003

(65) Prior Publication Data

US 2003/0210966 A1 Nov. 13, 2003

Related U.S. Application Data

(60) Provisional application No. 60/364,185, filed on Mar. 13, 2002.

(51) Int. Cl.$^7$ .............................................. B61D 45/00
(52) U.S. Cl. ........................ 410/115; 410/97; 410/104; 410/112; 410/113; 410/116; 52/309.2; 52/364
(58) Field of Search ............................ 52/309.2, 309.7, 52/309.16, 364, 366, 787.1; 296/181, 183, 193; 410/97, 104–106, 109–110, 112–116

(56) References Cited

U.S. PATENT DOCUMENTS

| | | | | |
|---|---|---|---|---|
| 1,379,882 A | * | 5/1921 | Swartz ....................... 52/489.1 |
| 3,481,642 A | | 12/1969 | Bonallack et al. ........... 296/181 |
| 3,598,273 A | | 8/1971 | Rau et al. .................... 220/1.5 |
| 3,970,324 A | | 7/1976 | Howat ......................... 280/610 |
| 4,641,469 A | * | 2/1987 | Wood ........................ 52/309.12 |
| 4,879,152 A | * | 11/1989 | Green .......................... 428/73 |
| 5,403,062 A | | 4/1995 | Sjostedt et al. .............. 296/181 |
| 5,893,248 A | * | 4/1999 | Beliveau .................... 52/309.7 |
| 5,934,741 A | | 8/1999 | Beukers et al. ............. 296/181 |
| 5,934,849 A | * | 8/1999 | Haire ......................... 410/113 |
| 6,106,205 A | | 8/2000 | Haire ......................... 410/113 |
| 6,219,983 B1 | | 4/2001 | Gråkjaar Jensen et al. 52/403.1 |
| 6,227,606 B1 | | 5/2001 | Schroeder et al. ....... 296/146.1 |
| 6,322,651 B1 | * | 11/2001 | Phelps ........................ 156/197 |
| 2001/0011832 A1 | | 8/2001 | Ehrlich et al. .............. 296/181 |

FOREIGN PATENT DOCUMENTS

| | | |
|---|---|---|
| DE | 3916065 | 11/1990 |
| GB | 2200601 | 8/1988 |

* cited by examiner

Primary Examiner—D. Glenn Dayoan
Assistant Examiner—Paul Chenevert
(74) Attorney, Agent, or Firm—Alston & Bird LLP

(57) ABSTRACT

A cargo-securing panel adapted to form a body of a cargo-carrying vehicle is provided. Such a panel comprises a honeycomb-configured core having opposed faces, wherein the core defines an angular groove having a portion extending between the faces and a portion extending through one of the faces. The core further defines a recess adjacent to the groove. A facing sheet is engaged with the one face of the core so as to form a composite. The facing sheet defines a gap extending therethrough in correspondence with the portion of the groove extending through the one face. An angular member includes a flange corresponding to the groove and is configured to be slidably engaged with the groove in order to secure the member to the composite. The member further includes an external portion extending outside the core and parallel to the one face, wherein the external portion defining an aperture corresponding to the recess in the core. The recess is adapted to receive a clip end of a cargo strap therein through the aperture so as to allow the clip end to cooperate with the angular member to secure the cargo strap to the composite. Associated apparatuses and methods are also provided.

30 Claims, 8 Drawing Sheets

COMPOSITE PANEL HAVING A SECURING TRACK INCORPORATED THEREIN AND ASSOCIATED APPARATUSES AND METHODS

CROSS-REFERENCE TO RELATED APPLICATIONS

This application claims the benefit of U.S. Provisional Application No. 60/364,185, filed Mar. 13, 2002.

BACKGROUND OF THE INVENTION

1. Field of the Invention

The present invention relates to composite panels for vehicles and, more particularly, to a composite panel having a cargo-securing track incorporated therein and being adapted to form the body of a cargo-carrying vehicle.

2. Description of Related Art

Cargo-carrying vehicles such as vans or trucks typically include a cargo-carrying body secured to the frame of the vehicle. Such a body is generally comprised of vertical and horizontal panels joined together so as to define a space for carrying the cargo. However, in some instances, there may be insufficient cargo to fill the body, which may cause the cargo to slide or otherwise undesirably move about the interior of the body during transport, thereby possibly resulting in damage to the cargo. In other instances, the nature of the cargo may be such that items may need to be placed in a certain orientation, such as upright against a wall of the body, but such items may be prone to falling over or impacting other items or the wall and thereby becoming damaged during transport. Thus, in either instance, the cargo must be sufficiently secured during transport so as to prevent damage to the items. In addition, the body is typically formed from a metal framework structure having panels attached thereto by fasteners. Such construction may be labor intensive and produce a heavy body for the vehicle, wherein the extra weight may further undesirably translate into, for example, reduced payload capacity and reduced fuel mileage for the vehicle.

One approach to securing cargo within the body of a cargo-carrying vehicle has been to provide cargo-securing tracks at periodic intervals along the walls of the body. Cargo-securing straps are provided in conjunction with the tracks, wherein each strap typically include clip ends configured to interact with the track so as to secure the straps to the body. Generally, such clip ends are inserted through an aperture in the track and include a latch mechanism to secure the clip end to the back surface of the track behind the aperture. Accordingly, such tracks often require space behind the apertures so as to allow the clip ends to be inserted. As a result the tracks are often mounted to the walls of the body so as to protrude therefrom to provide the necessary space behind the apertures. However, in such instances, the protrusion of the tracks from the walls is undesirable since the cargo-carrying space of the body is interrupted. Further, the tracks are typically through-bolted to the walls of the body. As such, where the panels form the body of a refrigerated truck, insulating efficiency is lost due to the thermal conductive path through the bolts from the inside surface of the truck body to the outside surface.

Thus, there exists a need for a body for a cargo-carrying vehicle formed from a lightweight, yet structurally robust, composite material. Such a body should desirably include cargo-securing tracks which are incorporated into the body so as to be flush therewith such that no component protrudes into the interior cargo-carrying space of the body. However, the flush-mounted cargo-securing tracks should also be capable of receiving a clip end of a cargo strap so as to secure the strap to the body. In addition, there exists a need for an insulated body for a refrigerated cargo-carrying vehicle having the desirable structural considerations as described, but which minimizes or eliminates heat conduction paths between the facing sheets of the composite so as to provide a more efficient insulating body.

BRIEF SUMMARY OF THE INVENTION

The above and other needs are met by the present invention which, in one embodiment, provides a cargo-securing panel adapted to form a body of a cargo-carrying vehicle. Such a panel comprises a honeycomb-configured core having opposed faces, wherein the core defines an angular groove having a portion extending between the faces and a portion extending through one of the faces. The core further defines a recess adjacent to the groove. A facing sheet is engaged with the one face of the core so as to form a composite. The facing sheet defines a gap extending therethrough in correspondence with the portion of the groove extending through the one face. An angular member includes a flange corresponding to the groove and is configured to be slidably engaged with the groove in order to secure the member to the composite. The member further includes an external portion extending outside the core and parallel to the one face, wherein the external portion defines an aperture corresponding to the recess in the core. The recess is adapted to receive a clip end of a cargo strap therein through the aperture so as to allow the clip end to cooperate with the angular member to secure the cargo strap to the composite.

Another advantageous aspect of the present invention comprises a method of forming a cargo-securing panel adapted to form a body of a cargo-carrying vehicle. First, an angular member is engaged with a corresponding angular groove in a composite in order to secure the member thereto. The composite has a honeycomb-configured core with opposed faces, with a facing sheet engaged with one of the faces. The angular groove includes a portion extending between the faces and a portion extending through the one face. The facing sheet defines a gap extending therethrough in correspondence with the portion of the groove extending through the one face. The member has a flange corresponding to the groove and is configured to be slidably engaged therewith. The member further includes an external portion capable of extending across the gap, outside the core and parallel to the one face, wherein the external portion defines an aperture. A recess is then formed in the core through the aperture, wherein the recess is adapted to receive a clip end of a cargo strap therein through the aperture so as to allow the clip end to cooperate with the angular member to secure the cargo strap to the composite.

Still another advantageous aspect of the present invention comprises a body for a cargo-carrying vehicle. Such a body includes a cargo-securing panel having a honeycomb-configured core with opposed faces, wherein the core defines an angular groove having a portion extending between the faces and a portion extending through one of the faces. The core further defines a recess adjacent to the groove. A facing sheet is engaged with the one face of the core so as to form a composite, wherein the facing sheet defines a gap extending therethrough in correspondence with the portion of the groove extending through the one face. An angular member is operably engaged with the panel. The member has a flange corresponding to the groove and is configured to be slidably engaged therewith in order to secure the member to the composite. The member further includes an external portion extending outside the core and parallel to the one face, wherein the external portion defines an aperture corresponding to the recess in the core. The recess is adapted to receive a clip end of a cargo strap therein through the aperture so as to allow the clip end to cooperate with the angular member to secure the cargo strap to the panel.

Yet another advantageous aspect of the present invention comprises a cargo-securing panel adapted to form a body of a cargo-carrying vehicle. Such a panel includes an elongate channel member having a first surface and a second surface defining at least one aperture. The panel further includes a honeycomb-configured core having opposed faces, wherein the core defines a groove extending through one of the faces. A facing sheet is conformally engaged with the one face so as to contiguously extend across the face and through the groove and to form a composite with the core. The groove is configured to be capable of securely receiving the channel member therein such that the second surface of the channel member extends across the groove and is substantially flush with the facing sheet.

A further advantageous aspect of the present invention comprises a method of forming a cargo-securing panel adapted to form a body of a cargo-carrying vehicle. First, a groove is formed in a composite. The composite includes a honeycomb-configured core having opposed faces and a facing sheet engaged with one of the faces, whereby the core defines the groove, the groove extends through the one face, and the facing sheet is conformally engaged with the one face so as to contiguously extend across the face and through the groove. A channel member is then secured to the facing sheet within the groove, wherein the channel member has a first surface and a second surface defining at least one aperture. The channel member is secured within the groove such that the second surface of the channel member extends across the groove and is substantially flush with the facing sheet.

Thus, embodiments of the present invention provide a lightweight, yet structurally robust, composite material from which a body for a cargo-carrying vehicle can be formed. Such a composite material includes cargo-securing tracks incorporated therein, wherein the tracks are flush with the composite such that no portion of the track protrudes from the composite forming a wall of the body into the interior cargo-carrying space of the body. The flush-mounted cargo-securing tracks are further capable of receiving a clip end of a cargo strap through an aperture and into a recess in the core of the composite so as to secure the strap to the body. Embodiments of the present invention further provide that the composite material may be filled with an insulating material and may therefore be used to form an insulated body for a refrigerated cargo-carrying vehicle. With the insulated composite having the desirable structural considerations as described, heat conduction paths between the facing sheets of the composite are minimized or eliminated and a more efficient insulating body is therefore provided. As such, embodiments of the present invention provide significant advantages as detailed herein.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
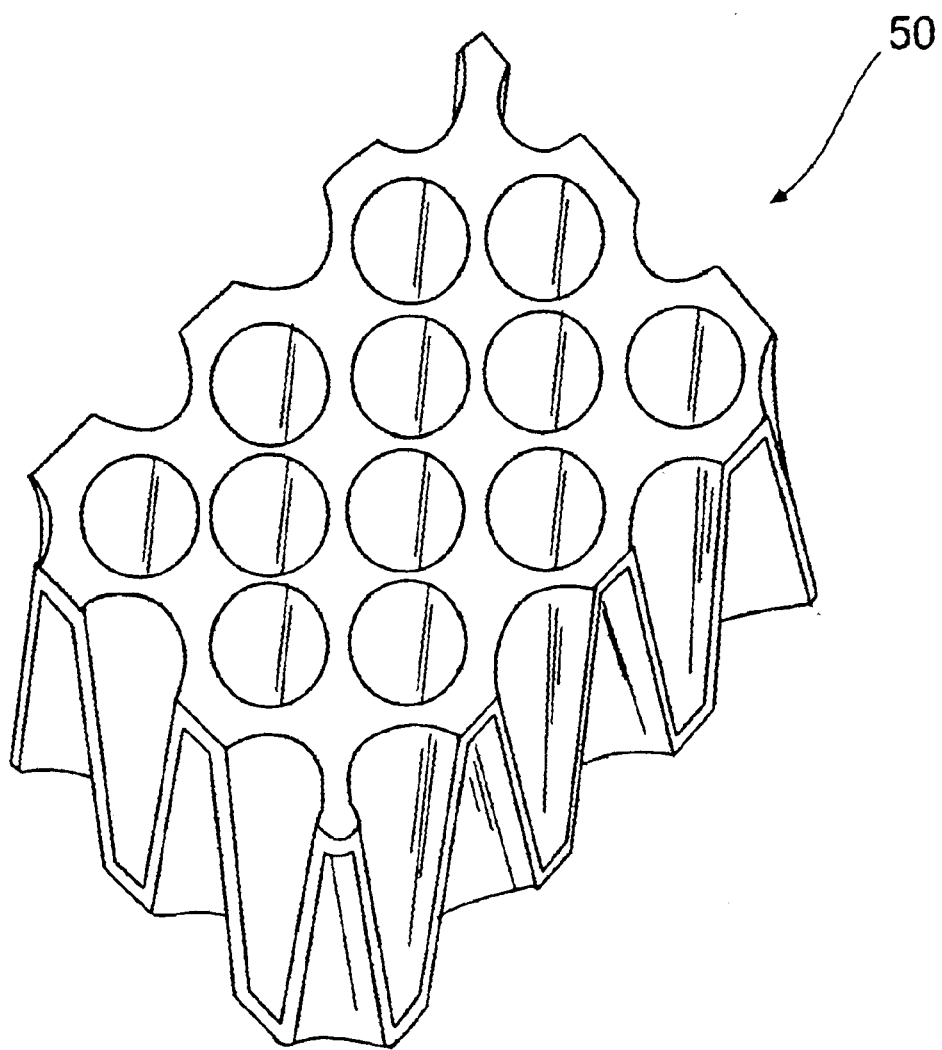
FIG. 1 is a perspective schematic of a core of a composite panel according to one embodiment of the present invention.
Figure 2A:
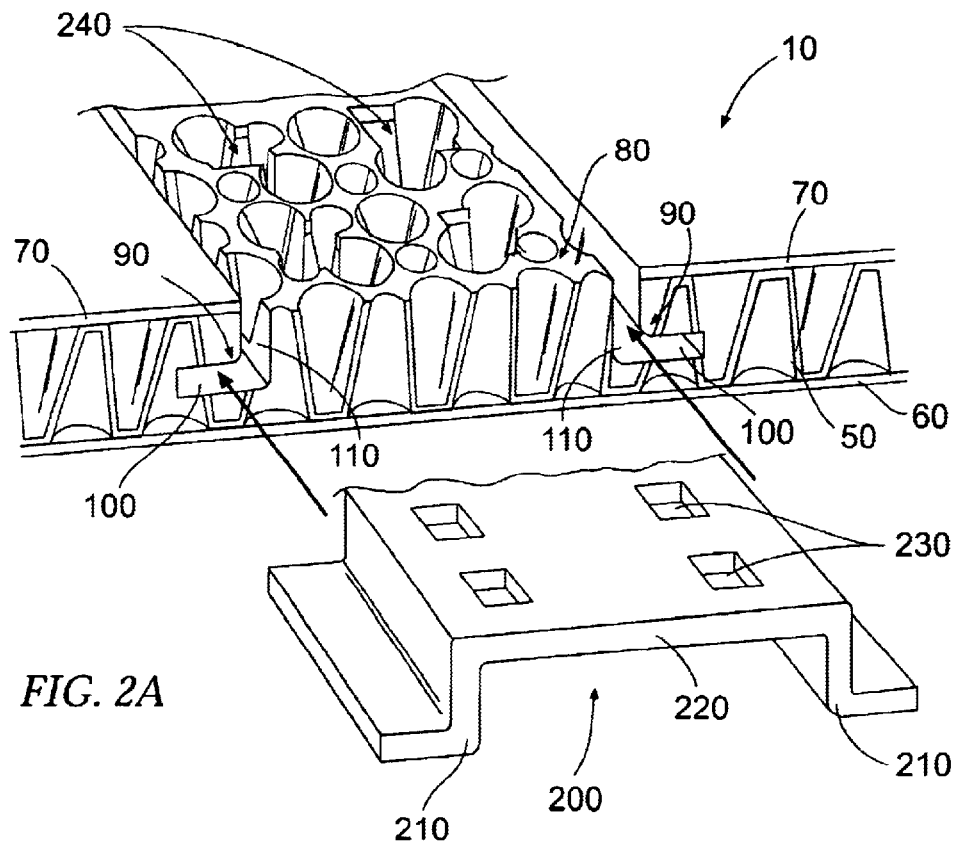
FIG. 2A is a perspective schematic of a composite panel and a securing track configured to be incorporated therein according to one embodiment of the present invention.
Figure 2B:
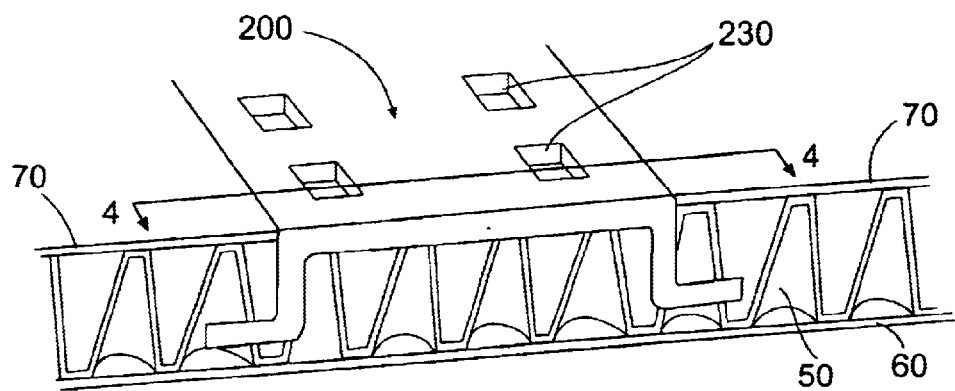
FIG. 2B is a perspective schematic of a composite panel having the securing track incorporated therein according to one embodiment of the present invention.
Figure 4:
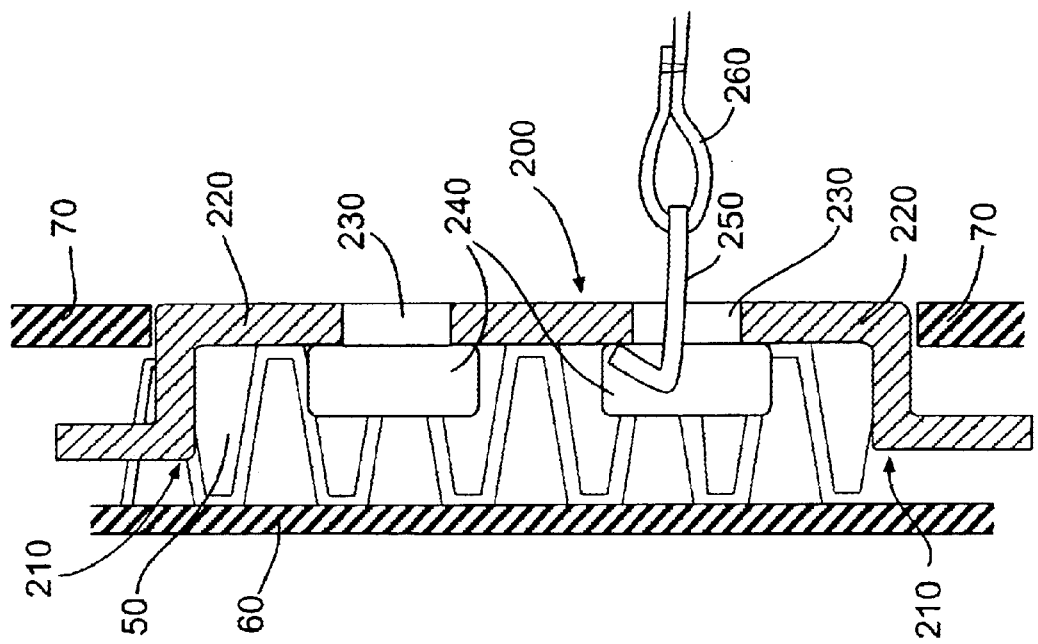
FIG. 4 is a cross-sectional view of a composite panel having a securing track incorporated therein according to one embodiment of the present invention taken along line 4—4 of FIG. 2B.
Figure 3:
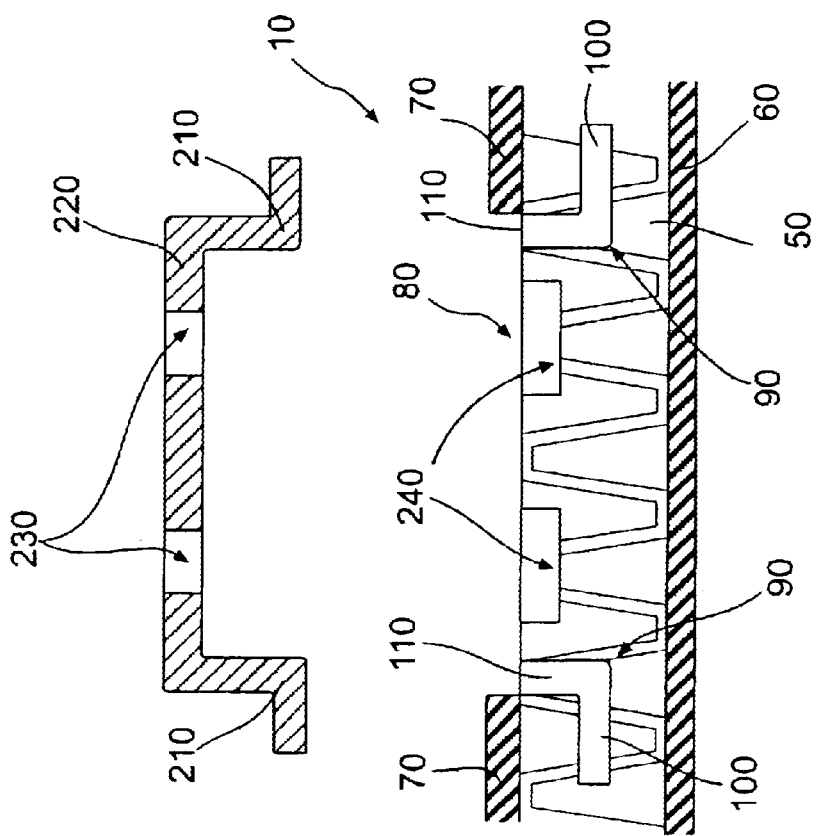
FIG. 3 is an exploded cross-sectional view of a composite panel having a securing track capable of being incorporated therewith according to one embodiment of the present invention.

FIGS. 2A, 2B, 3, and 4 schematically represent a composite panel according to one embodiment of the present invention, the panel being indicated generally by the numeral 10. The panel 10 comprises a honeycomb-configured core 50 having opposing faces, as shown in FIG. 1, with the core 50 further including a pair of facing sheets 60, 70 engaged with the core 50. Such a panel 10 may be used as, for example, a structural wall of a truck or van body. The core 50 and/or the facing sheets 60, 70 may be comprised of, for example, a thermoplastic or other suitable lightweight material having the structural properties and/or other properties commensurate with the requirements described herein as will be appreciated by one skilled in the art. More particularly, the panel 10 may be comprised of, for example, PEPCORE™, manufactured by Phelps Engineered Plastics of Danbury, Conn., which has a honeycomb-configured thermoplastic core faced with plastic facing sheets. The PEPCORE™ material is configured with individual cells in a "honeycomb" configuration and is made from a single sheet of thermoplastic material such as, for example, a high-impact polystyrene. Each cell has somewhat triangulated or cone shape, such that any particular cell is only open at one end prior to the application of the facing sheets 60, 70, so as to provide a semi-closed cell. That is, no cell in the core 50 has an opening extending between the opposed faces of the core 50. The cells are also alternatingly disposed such that the opening of one cell is defined by one face of the core 50, while the opening of an adjacent cell is defined by the opposing face. The facing sheets 60, 70 may be comprised of, for example, polycarbonate such as Lexan™, fiberglass-reinforced polyester (FRP), acrylonitrile butadiene styrene (ABS), a material having a memory, or other suitable material. Further details of such a panel may be found in, for example, U.S. Pat. No. 6,322,651 to Phelps, which is incorporated herein in its entirety by reference.

In order to form the body of a cargo-carrying vehicle, the panel 10 further comprises one or more cargo-securing tracks 200 (also referred to herein as an "angular member" or "channel member") incorporated therein. In some advantageous embodiments, a track 200 is incorporated into and secured to the panel 10 without the use of adhesives, fasteners, or the like. In such instances, one of the facing sheets 60, 70 is configured so as to define a gap 80 exposing a portion of the core 50. The gap 80 may be formed during the manufacturing process of the panel 10 where, for example, the facing sheet defining the gap 80 (indicated by the numeral 70 in FIGS. 2A, 2B, 3, and 4) may be preformed with the gap 80 and then bonded to the core 50. Alternatively, the gap 80 may be formed in the facing sheet 70 by, for example, a routing and/or a thermoforming process. The panel 10 further includes an angular groove or channel 90 formed in the core 50. The groove 90 includes a lateral portion 100 extending through the core 50 between the facing sheets 60, 70 and an angled portion 110 extending from the lateral portion 100 and through the face of the core 50 to the gap 80. The angle between the angled portion 110 and the lateral portion 100 may vary, but, in some embodiments, may be about ninety degrees. The groove 90 may be formed in the panel 10 by, for example, routing and/or thermoforming the core 50. According to advantageous embodiments of the present invention, the groove 90 does not extend to the facing sheet 60 opposite to the facing sheet 70 defining the gap 80. Further, in one particularly advantageous embodiment, two grooves 90 are formed in a mirror image configuration in the core 50 with each groove 90 having an angled portion 110 extending to the gap 80.

Once the panel 10 is prepared with the gap 80 and the grooves 90, a cargo-securing track 200 is engaged with the grooves 90. The track 200 is configured to have angular portions or flanges 210 corresponding to the grooves 90 and an external portion 220 contiguously extending between the flanges 210 in the gap 80 and externally to the core 50. As such, the track 200, the gap 80, and the grooves 90 are configured such that the track 200 may be slid into engagement with the grooves 90 by introducing the flanges 210 into the corresponding grooves 90 from an edge of the panel 10. The flanges 210 and/or the grooves 90 may be lubricated with an appropriate material, if necessary, in order to facilitate the sliding engagement of the flanges 210 with the grooves 90. In some instances, the gap 80 and the core 50 are structured such that the external portion 220 of the track 200 lies flush with the outermost surface of the facing sheet 70 defining the gap 80. The track 200 may be comprised of, for example, a metal such as stainless steel. As such, once the flanges 210 of the track 200 are engaged with the grooves 90, the track 200 is effectively secured to the panel 10. That is, the panel 10 retains the track 200 against forces directed outwardly of the facing sheet 70 defining the gap 80 without the use of adhesives, fasteners, or the like between the track 200 and the panel 10.

The track 200 further defines one or more apertures 230 in the external portion 220, while the core 50 is configured to define a recess 240 behind each aperture 230. The recess 240 extends laterally and/or axially with respect to the track 200 so as to have lateral and/or axial dimensions equal to or greater than the aperture 230. The recess 240 is further configured to be capable of receiving a complementarily-configured clip end (shown as element 250 in FIGS. 4 and 6) of a cargo-securing strap (shown as element 260 in FIGS. 4 and 6) therein through the aperture 230. The clip end 250 is further configured so as to cooperate with the track 200 to secure the clip end 250 to the track 200 and thus secure the cargo-securing strap 260 to the panel 10. Such cargo-securing straps and clip ends are commonly used in, for example, moving trucks, and will be readily understood and appreciated by one skilled in the art. In order to properly locate the recesses 240 with respect to the apertures 230, the recesses 240 may be formed by, for example, a thermoforming process. More particularly, a heated element (not shown) may be inserted through an aperture 230 once the track 200 has been adjusted to the desired position in the grooves 90 and with respect to the remainder of the panel 10. Accordingly, the heated element may be used to melt the portion of the core 50 behind the aperture 230 so as to thermoform the recess 240. However, in some instances, the recesses 240 may be formed when the gap 80 and the grooves 90 are formed such as, for example, by the same routing and/or thermoforming process.

Figure 5:
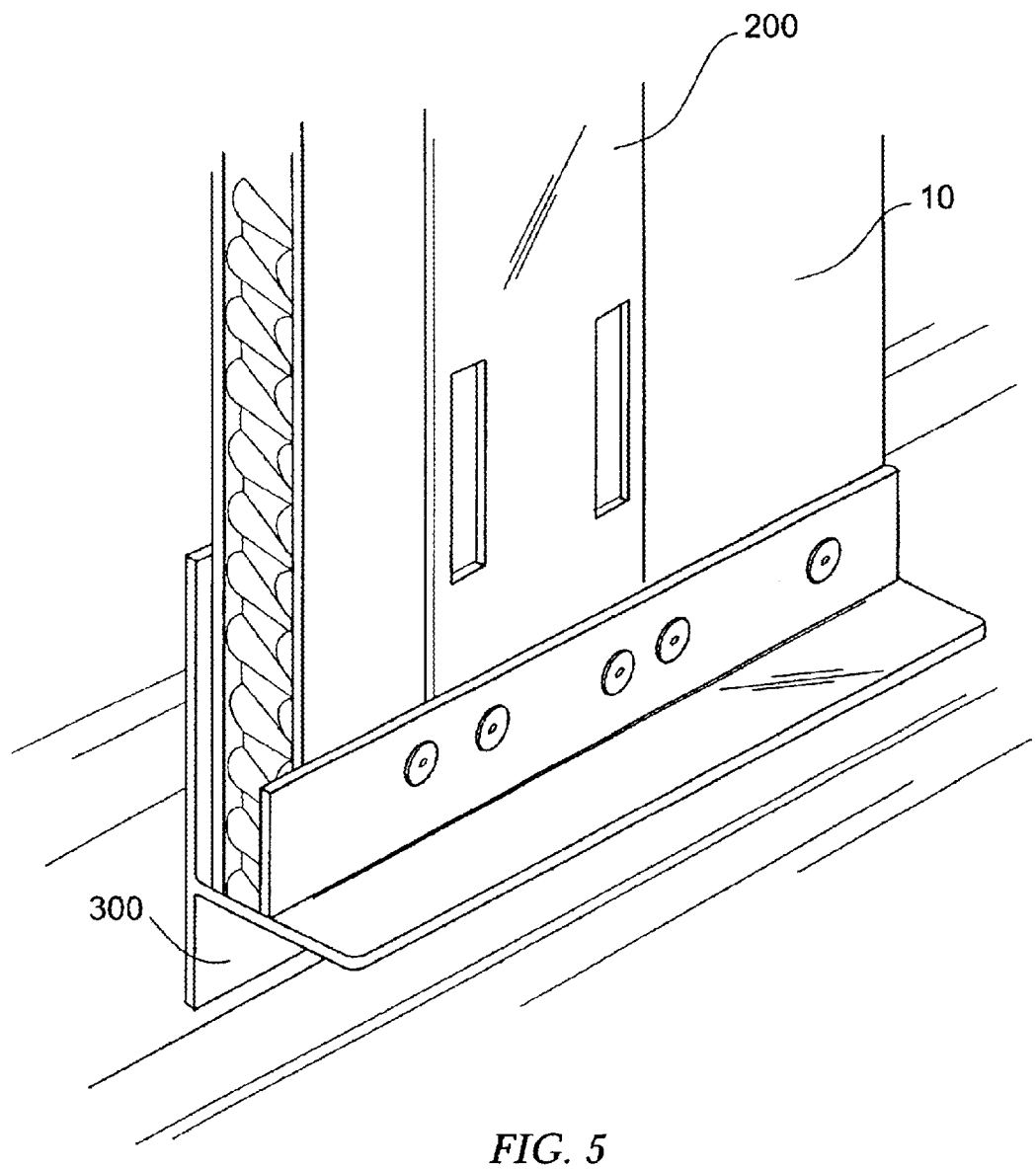
FIG. 5 is a perspective view of a composite panel having a securing track incorporated therein according to one embodiment of the present invention illustrating a rail used to secure a panel to the frame of a vehicle.
Figure 6:
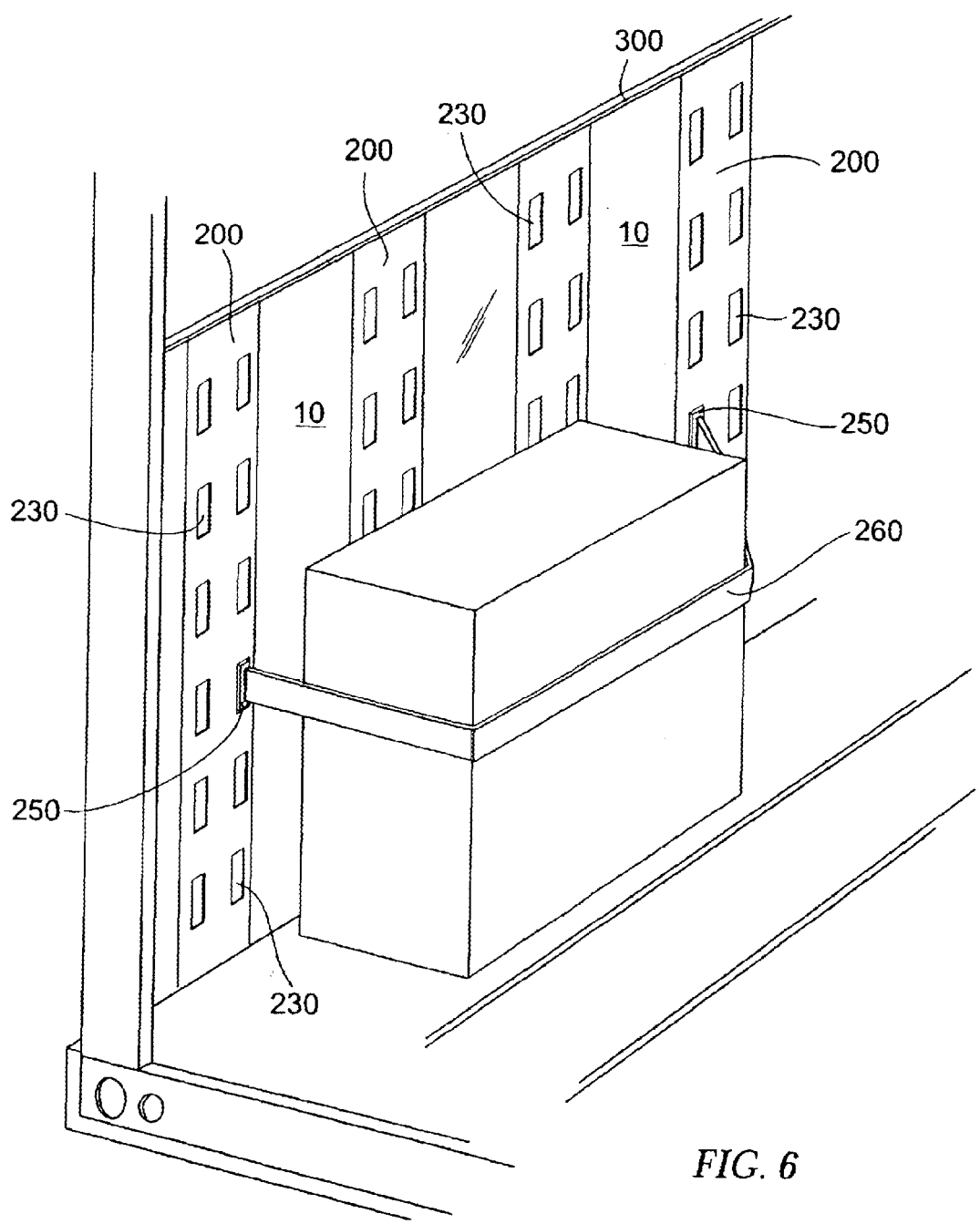
FIG. 6 is a perspective schematic of a composite panel having a securing track incorporated therein according to one embodiment of the present invention used to form the body of a vehicle such as a truck, the panel and securing track having an item secured thereto with a cargo-securing strap having corresponding clip ends.

The composite panel 10 incorporating the cargo-securing track 200 may be particularly used to make the vertical walls and doors of a truck body. In such instances, the tracks 200 may be arranged vertically and/or horizontally within the vertically-disposed panel 10 and within the truck body so as to allow cargo-securing straps to be secured thereto via respective clip ends. Accordingly, cargo may be secured to one or more panels 10 or within a particular area of the body. In order to form the vertical walls of the body, the panels 10 incorporating the tracks 200 may then be fitted with, for example, extruded aluminum rails (shown as element 300 in FIG. 5) along the top and bottom edges thereof. As generally shown in FIG. 6, the rails 300 may then be bolted or otherwise attached to the tracks 200 within the panels 10. The rails 300 may then be appropriately secured to other components of the truck body so as to tie the tracks 200 to, for instance, the main frame of the truck body. With the tracks 200 tied to the body of the truck as described, the tracks 200 then become a part of the structural framework of the truck body and thus, in some instances, may also serve to reinforce the body.

According to another advantageous aspect of the present invention, the core 50 of the composite panel 10 may be filled with an insulating material (not shown) such as, for example, a polyurethane foam or other polymeric foam, prior to the facing sheet being applied, so as to form insulated panels capable of being used to construct, for instance, a body for a refrigerated truck or van. Such an insulated panel 10 may also have one or more tracks 200 incorporated therein as described above. Accordingly, such insulated composite panels 10 forming the body of a refrigerated truck provide distinct advantages over a conventional refrigerated truck panel, which typically requires separate insulation, frame members, and facing sheets to be bolted or otherwise assembled together. Such conventional insulated panels are also more labor-intensive to assemble and are less efficient in providing the necessary insulation due to the thermally conductive paths through the bolts between the inside surface of the truck body and the outside surface. Thus, when such an insulated composite panel 10, incorporating cargo-securing tracks 200 into the truck body without using adhesives, fasteners, or the like, is implemented, a more efficient insulating structure is obtained since the thermally-conductive paths from the interior of the body to the exterior thereof are significantly reduced or eliminated. One skilled in the art will also appreciate that the use of such an insulated panel 10 may also be advantageous for other purposes such as, for example, noise reduction, and such insulated panels 10 are not limited to purposes involving the thermal properties thereof.

Figure 7A:
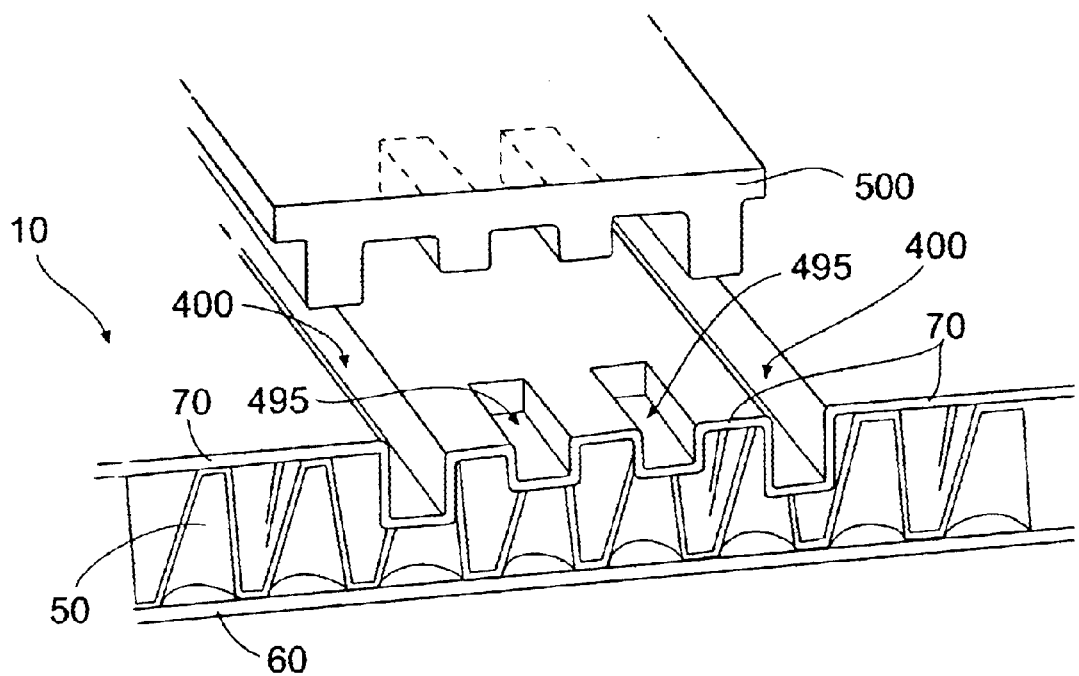
FIG. 7A is a perspective schematic of a composite panel having a groove formed therein by a die according to an alternate embodiment of the present invention.
Figure 7B:
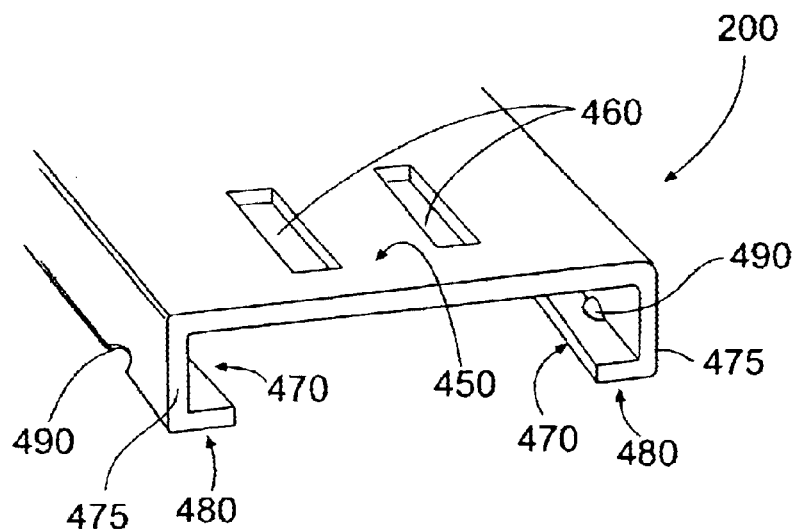
FIG. 7B is a perspective schematic of a securing track configured to be incorporated within the groove in the composite panel according to the alternate embodiment of the present invention shown in FIG. 7A.
Figure 8:
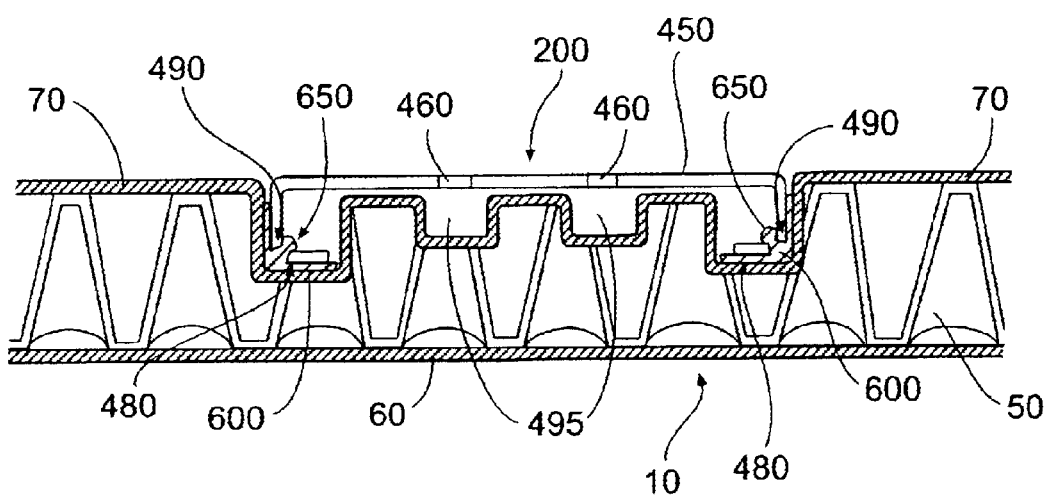
FIG. 8 is a perspective schematic of a composite panel having the securing track incorporated therein according to the embodiment of the present invention shown in FIG. 7A.

Another advantageous embodiment of the present invention may also utilize a composite panel 10 as previously described, but with the track 200 secured thereto in a different manner, as shown in FIGS. 7A, 7B, and 8. Where necessary, the panel 10 may also include an insulating material disposed within the core 50 and between the facing sheets 60, 70 to form an insulated panel 10. In this embodiment, the track 200 is secured to the panel 10 through the use of, for example, an adhesive material though, in other instances, fasteners or the like may also be used. It is also desirable for the track 200 to be secured to the panel 10 so as to be flush therewith. Accordingly, where a track 200 is secured to a panel 10, the panel 10 is first reshaped to form a groove 400 capable of accepting the track 200 therein. Such reshaping of the panel 10 to form the groove 400 may be accomplished, for example, by heating the thermoplastic facing sheet 70 and the core 50 and then deforming the panel 10 by pressing an appropriately shaped die 500 against the panel 10. One skilled in the art will appreciate, however, that the groove 400 may be formed in many different ways. For example, the die 500 itself may be heated and pressed against the panel 10 to form the groove 400. Also evident from the foregoing discussion is that the groove 400, when formed, is essentially defined by the core 50. However, since the facing sheet 70 is engaged with the core 50 to form the composite structure of the panel 10 prior to the formation of the groove 400, the facing sheet 70 remains engaged with the core 50 as a contiguous member during the groove-forming process and thus becomes reshaped so as to conform to the channel 400. That is, the facing sheet 70 remains conformally engaged with the core 50 so as to contiguously extend across the face of the core 50 and through the groove 400 as a result of the groove-forming process. Such a configuration provides various advantages such as, for example, providing a contiguous barrier to moisture, air, noise, and the like.

Figure 9A:
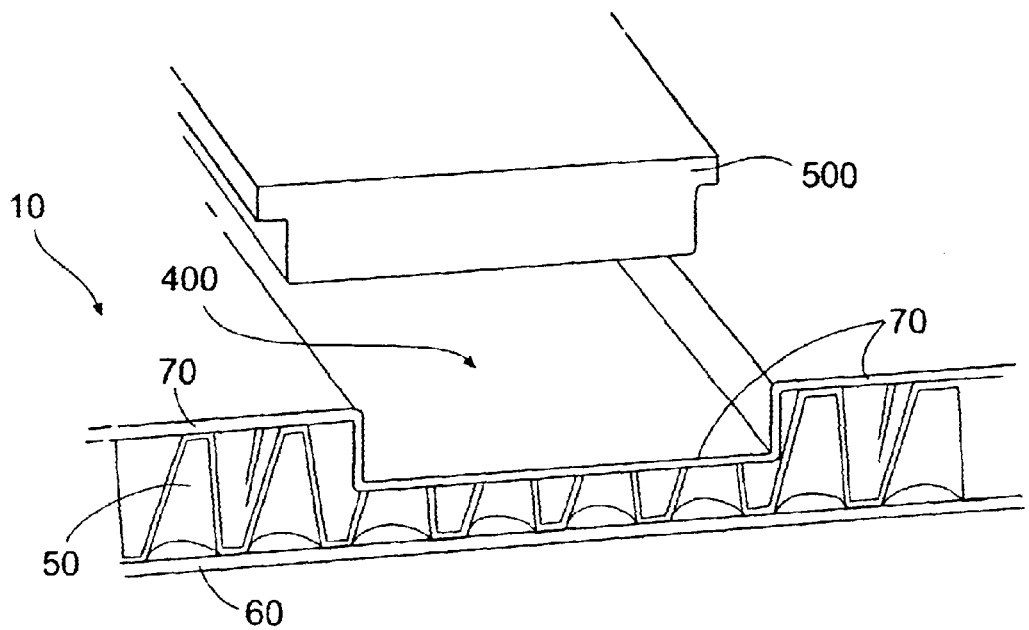
FIG. 9A is a perspective schematic of a composite panel having a groove formed therein by a die according to another alternate embodiment of the present invention.
Figure 9B:
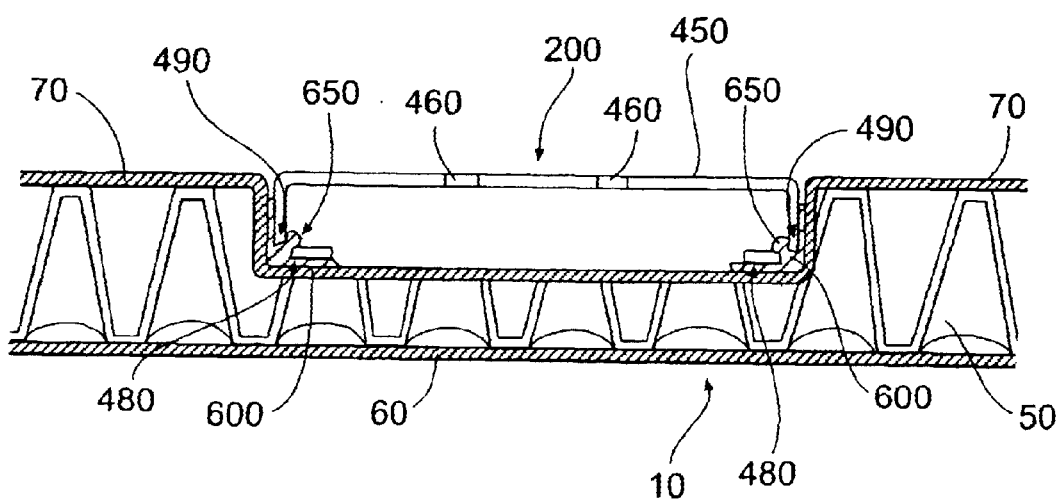
FIG. 9B is a perspective schematic of a composite panel having the securing track incorporated therein according to the embodiment of the present invention shown in FIG. 9A.

In some embodiments, the track 200 is configured as a channel member having a surface 450 defining one or more apertures 460. Further, the groove 400 is configured to cooperate with and to receive the channel member 200 such that the surface 450 is substantially flush with the facing sheet 70. In addition, the channel member 200 includes a structure 470 extending away from the surface 450, wherein the structure 470 includes at least one securing surface 480 and defines one or more securing apertures 490. In one embodiment, the structure 470 comprises a flange 475 extending from each of the opposing ends of the surface 450. Accordingly, the groove 400, when formed in the panel 10, is configured to receive the pair of flanges 475 when the channel member 200 is inserted therein. The groove 400 is further configured to define a recess 495 corresponding to each of the apertures 460 in the surface 450 wherein each recess 495 and corresponding aperture 460 are configured to cooperate to receive a clip end 250, as previously described, in order to secure a cargo-securing strap 260 to the channel member 200, and thus to the panel 10. In an alternate embodiment, as shown in FIGS. 9A and 9B, the groove 400 may be configured to extend laterally in the panel 10 and at a substantially constant depth, wherein such a groove 400 is capable of receiving the channel member 200 therein. In such an embodiment, a separate recess 495 corresponding to each aperture 460 is not required. As such, following the formation of the groove 400, the channel member 200 can be secured thereto by, for example, an adhesive material 600 or other suitable bonding agent, disposed between the facing sheet 70 within the groove 400 and at least the securing surface 480 of the channel member 200 so as to cause adherence therebetween. In some embodiments, the adhesive material 600 is configured so as to be capable of entering the securing apertures 490 of the channel member 200, when the channel member 200 is introduced into contact with the adhesive material 600 in the groove 400, so as to form adhesive rivets or finger rivets 650 as the adhesive material 600 sets. Of course, one skilled in the art will also readily appreciate that the groove 400 may be configured to account for the thickness of the adhesive material 600, such that the surface 450 of the channel member 200 is substantially flush with the facing sheet 70 when the adhesive material 600 sets. Thus, this embodiment of the present invention is advantageous in that the facing sheet 70 of the panel 10 is not interrupted when the channel member 200 is attached to the panel 10. Accordingly, the panel 10 retains the strength and other advantages of the composite structure. In addition, securing the channel member 200 to the panel 10 in such a manner also eliminates thermally conductive paths between the inside and outside surfaces of the truck body, thereby providing a more efficient insulating structure.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A cargo-securing panel adapted to form a body of a cargo-carrying vehicle, said panel comprising:
    a honeycomb-configured core having opposed faces and defining an angular groove having a portion extending between the faces and a portion extending through one of the faces, the core further defining a recess adjacent to the groove;
    a facing sheet engaged with one of the faces of the core so as to form a composite, the facing sheet defining a gap extending therethrough in correspondence with the portion of the groove extending through the one face; and an angular member having a flange corresponding to the groove and configured to be slidably engaged therewith in order to secure the member to the composite, the member further including an external portion extending outside the core and parallel to the one face, the external portion defining an aperture corresponding to the recess in the core, the recess being adapted to receive a clip end of a cargo strap therein through the aperture so as to allow the clip end to cooperate with the angular member to secure the cargo strap to the composite.

2. A panel according to claim 1 wherein the honeycomb-configured core further comprises a plurality of adjacent cells, each cell extending from one face toward the opposing face.

3. A panel according to claim 2 wherein each cell defines an opening in one face and is closed toward the opposing face.

4. A panel according to claim 2 wherein each cell defines an opening in one face and is closed toward the opposing face, and wherein the plurality of adjacent cells are alternatingly disposed such that the opening of one cell is defined in one face and the opening of an adjacent cell is defined in the opposing face.

5. A panel according to claim 1 wherein the honeycomb-configured core is formed from a sheet of a thermoplastic material.

6. A panel according to claim 1 wherein the honeycomb-configured core is comprised of high-impact polystyrene.

7. A panel according to claim 1 wherein the facing sheet is comprised of a plastic material selected from the group consisting of polycarbonate, fiberglass-reinforced polyester (FRP), acrylonitrile butadiene styrene (ABS), a material having a memory, and combinations thereof.

8. A panel according to claim 1 wherein the honeycomb-configured core is substantially filled with an insulating material prior to the facing sheet being engaged therewith so as to form an insulated composite.

9. A method of forming a cargo-securing panel adapted to form a body of a cargo-carrying vehicle, said method comprising:
    engaging an angular member with a corresponding angular groove in a composite in order to secure the member thereto, the composite having a honeycomb-configured core with opposed faces and a facing sheet engaged with one of the faces, the angular groove having a portion extending between the faces and a portion extending through the one face, the facing sheet defining a gap extending therethrough in correspondence with the portion of the groove extending through the one face, the member having a flange corresponding to the groove and being configured to be slidably engaged therewith, the member further including an external portion capable of extending across the gap, outside the core and parallel to the one face, with the external portion defining an aperture; and
    forming a recess in the core through the aperture, the recess being adapted to receive a clip end of a cargo strap therein through the aperture so as to allow the clip end to cooperate with the angular member to secure the cargo strap to the composite.

10. A method according to claim 9 further comprising substantially filling the honeycomb-configured core with an insulating material prior to the facing sheet being engaged therewith so as to form an insulated composite.

11. A method according to claim 9 further comprising forming the angular groove in the honeycomb-configured core using at least one of a routing process and a thermoforming process.

12. A method according to claim 9 wherein forming a recess further comprises forming a recess in the honeycomb-configured core using at least one of a routing process and a thermoforming process.

13. A body for a cargo-carrying vehicle, said body comprising:
    a cargo-securing panel, comprising:
        a honeycomb-configured core having opposed faces and defining an angular groove having a portion extending between the faces and a portion extending through one of the faces, the core further defining a recess adjacent to the groove; and
        a facing sheet engaged with the one face of the core so as to form a composite, the facing sheet defining a gap extending therethrough in correspondence with the portion of the groove extending through the one face; and
    an angular member operably engaged with the panel, the member having a flange corresponding to the groove and being configured to be slidably engaged therewith such that the member is secured to the composite, the member further including an external portion extending outside the core and parallel to the one face, the external portion defining an aperture corresponding to the recess in the core, the recess being adapted to receive a clip end of a cargo strap therein through the aperture so as to allow the clip end to cooperate with the angular member to secure the cargo strap to the panel.

14. A body according to claim 13 wherein the honeycomb-configured core further comprises a plurality of adjacent cells, each cell extending from one face toward the opposing face.

15. A body according to claim 14 wherein each cell defines an opening in one face and is closed toward the opposing face.

16. A body according to claim 14 wherein each cell defines an opening in one face and is closed toward the opposing face, and wherein the plurality of adjacent cells are alternatingly disposed such that the opening of one cell is defined in one face and the opening of an adjacent cell is defined in the opposing face.

17. A body according to claim 13 wherein the honeycomb-configured core is substantially filled with an insulating material prior to the facing sheet being engaged therewith so as to form an insulated composite.

18. A cargo-securing panel adapted to form a body of a cargo-carrying vehicle, said panel comprising:
    an elongate channel member having a first surface and a second surface defining at least one aperture;
    a honeycomb-configured core having opposed faces, the core defining a groove extending through one of the faces;
    a facing sheet conformally engaged with the one face so as to contiguously extend across the face and through the groove and to form a composite with the core, the groove being configured to be capable of securedly receiving the channel member therein such that the second surface of the channel member extends across the groove and is substantially flush with the facing sheet.

19. A panel according to claim 18 wherein the groove is further configured to include a recess corresponding to each of the at least one aperture, the recess being adapted to receive a clip end of a cargo strap therein so as to allow the clip end to cooperate with the channel member to secure the cargo strap to the composite.

20. A panel according to claim 18 further comprising an adhesive operably engaged between the facing sheet within the groove and the first surface of the channel member for securing the channel member within the groove.

21. A panel according to claim 18 wherein the honeycomb-configured core further comprises a plurality of adjacent cells, each cell extending from one face toward the opposing face.

22. A panel according to claim 21 wherein each cell defines an opening in one face and is closed toward the opposing face.

23. A panel according to claim 21 wherein each cell defines an opening in one face and is closed toward the opposing face, and wherein the plurality of adjacent cells are alternatingly disposed such that the opening of one cell is defined in one face and the opening of an adjacent cell is defined in the opposing face.

24. A panel according to claim 18 wherein the honeycomb-configured core is substantially filled with an insulating material prior to the facing sheet being engaged therewith so as to form an insulated composite.

25. A method of forming a cargo-securing panel adapted to form a body of a cargo-carrying vehicle, said method comprising:

forming a groove in a composite, the composite including a honeycomb-configured core having opposed faces and a facing sheet engaged with one of the faces, whereby the core defines the groove, the groove extends through the one face, and the facing sheet is conformally engaged with the one face so as to contiguously extend across the face and through the groove; and securing a channel member to the facing sheet within the groove, the channel member having a first surface and a second surface defining at least one aperture, the channel member being secured within the groove such that the second surface of the channel member extends across the groove and is substantially flush with the facing sheet.

26. A method according to claim 25 wherein forming the groove in the composite further comprises heating the composite and then deforming the composite with a groove-shaped die so as to form the groove.

27. A method according to claim 25 wherein forming the groove in the composite further comprises deforming the composite with a heated groove-shaped die so as to form the groove.

28. A method according to claim 25 wherein securing the channel member within the groove further comprises securing the channel member within the groove with an adhesive operably engaged between the facing sheet within the groove and the first surface of the channel member.

29. A method according to claim 25 wherein the grove is further configured to include a recess corresponding to each of the at least one aperture and the method further comprises inserting a clip end of a cargo strap into the recess through the aperture, the clip end being configured cooperate with the channel member to secure the cargo strap thereto.

30. A method according to claim 25 further comprising substantially filling the honeycomb-configured core with an insulating material prior to the facing sheet being engaged therewith so as to form an insulated composite.

* * * * *